(12) United States Patent
Jang

(10) Patent No.: US 8,780,186 B2
(45) Date of Patent: Jul. 15, 2014

(54) STEREOSCOPIC IMAGE REPRODUCTION METHOD IN QUICK SEARCH MODE AND STEREOSCOPIC IMAGE REPRODUCTION APPARATUS USING SAME

(75) Inventor: Jun-Yeoung Jang, Seoul (KR)

(73) Assignee: LG Electronics Inc., Seoul (KR)

(*) Notice: Subject to any disclaimer, the term of this patent is extended or adjusted under 35 U.S.C. 154(b) by 535 days.

(21) Appl. No.: 13/060,957

(22) PCT Filed: Jun. 10, 2009

(86) PCT No.: PCT/KR2009/003125
§ 371 (c)(1),
(2), (4) Date: Feb. 25, 2011

(87) PCT Pub. No.: WO2010/143760
PCT Pub. Date: Dec. 16, 2010

(65) Prior Publication Data
US 2011/0149051 A1 Jun. 23, 2011

(51) Int. Cl.
*H04N 13/04* (2006.01)
*H04N 5/931* (2006.01)

(52) U.S. Cl.
USPC ............................................. 348/51; 386/206

(58) Field of Classification Search
None
See application file for complete search history.

(56) References Cited

U.S. PATENT DOCUMENTS

2009/0142041 A1* 6/2009 Nagasawa et al. ............ 386/124
2010/0150523 A1* 6/2010 Okubo et al. .................... 386/68

FOREIGN PATENT DOCUMENTS

| CN | 1799267 A | 7/2006 |
|---|---|---|
| EP | 1 427 222 A2 | 6/2004 |
| EP | 1 781 046 A1 | 5/2007 |
| JP | 2003-333624 | 11/2003 |
| JP | 2005-110121 A | 4/2005 |
| JP | 2008-103820 A | 5/2008 |
| KR | 10-2004-0045519 | 6/2004 |
| KR | 10-2006-0076183 | 7/2006 |

OTHER PUBLICATIONS

Chinese Office Action dated Dec. 20, 2012 issued in Application No. 200980134775.5 (with English translation).
International Search Report issued in PCT/KR2009/003125 dated Mar. 11, 2010.
Puri, A. et al. "Basics of Stereoscopic Video, New Compression Results With MPEG-2 and a Proposal for MPEG-4"; Signal Processing: Image Communications; Elsevier Science Publishers, Amsterdam, NL; vol. 10; No. 1-3; Jul. 31, 1997; pp. 201-234 (XP-004082708).
Chinese Office Action dated Jun. 27, 2013 issued in Application No. 200980134775.5 (with English translation).
European Search Report dated Jul. 5, 2013 issued in Application No. 09 84 5854.

* cited by examiner

*Primary Examiner* — Joseph Ustaris
*Assistant Examiner* — Maryam Nasri
(74) *Attorney, Agent, or Firm* — KED & Associates LLP

(57) ABSTRACT

An image reproduction may be provided by reproducing a stereoscopic image, receiving a selection of a trick mode from a user while the stereoscopic image is being reproduced, and changing the stereoscopic image into a two-dimensional image by selecting one of a left image and a right image, when the trick mode is selected. The image reproduction may also include receiving a setting for an object from the user when the trick mode is selected, and automatically reproducing the stereoscopic image at a normal speed, when an image including the object is reached while reproducing the stereoscopic image is performed in the trick mode, wherein setting for the object is received prior to being provided in the trick mode.

11 Claims, 3 Drawing Sheets

STEREOSCOPIC IMAGE REPRODUCTION METHOD IN QUICK SEARCH MODE AND STEREOSCOPIC IMAGE REPRODUCTION APPARATUS USING SAME

BACKGROUND OF THE INVENTION

1. Field of the Invention

The present invention relates to a method and apparatus for reproducing a stereoscopic image and, more particularly, to an apparatus and method for displaying a stereoscopic image in a trip mode. A trip mode may also be referred to as a trick mode.

2. Description of the Related Art

Recently, as the interest in a stereoscopic image service is increasing, devices for providing a stereoscopic image have been continued to be developed. One of the schemes of implementing a stereoscopic image is a stereoscopic scheme.

A basic principle of the stereoscopic scheme is that images arranged to be perpendicular to a person's left and right eyes are separately inputted, and the images respectively inputted to the left and right eyes are coupled to generate a stereoscopic image in the person's brain. In this case, the arrangement of the images to be perpendicular to each other refers to a state in which the respective images do not interfere with each other.

Detailed methods for excluding interference include a polarization scheme, a time-sequential scheme, and a spectral scheme.

First, the polarization scheme is separating the respective images by using the polarization filter. Namely, the polarization filters perpendicular to the image for the left eye and the image for the right eye are applied, different images filtered by the polarization filters are inputted to the left and right visual fields. The time-sequential scheme is a method in which left and right images are alternately displayed and active glasses worn by the user are synchronized with the alternately displayed images to thus separate the respective images. Namely, when the images are alternately displayed, the shutter of the active glasses synchronized with the alternately displayed image opens only the visual field to which the corresponding image needs to be inputted and shuts the other visual field, thus separately inputting the left and right images.

Meanwhile, the spectral scheme is a method of projecting left and right images through a spectrum filter having a spectrum band in which RGB spectrums do not overlap. With respect to the thusly projected left and right images, the user wears passive glasses having the spectrum filter allowing only a spectrum area is set for the left and right images, thus separately receiving left and right images.

However, as described above, the stereoscopic image is implemented by using two two-dimensional images, a phenomenon in which an image is unnatural or distorted may occur. In particular, this phenomenon becomes severe when the user selects a trip mode and performs an operation in the trip mode with respect to the stereoscopic image.

Also, users' viewing satisfaction is degraded due to the unnatural screen image or the distorted image that may be caused in the trip mode.

SUMMARY OF THE INVENTION

Therefore, in order to address the above matters, the various features described herein have been conceived.

An aspect of the present invention provides a method for changing a stereoscopic image into a two-dimensional (2D) image when a trip mode is entered while the stereoscopic image is being displayed, thus preventing the generation of an unnatural image or a distorted image even when an image is quickly displayed through high speed searching.

Another aspect of the present invention provides a method for effectively changing a stereoscopic image into a two-dimensional (2D) image when a trip mode is entered without employing an element for changing the displayed stereoscopic image into the 2D image.

Another aspect of the present invention provides a method for preventing the generation of an unnatural image or a distorted image even when an image is quickly displayed through high speed searching, thus improving users' viewing satisfaction.

To achieve the above objects, there is provided a method, which forms a stereoscopic image by alternately displaying a left image and a right image, for reproducing a stereoscopic image in a trip mode, including: reproducing a stereoscopic image; receiving a selection of a trip mode from a user while the stereoscopic image is being reproduced; and when the trip mode is entered, changing the stereoscopic image into a two-dimensional (2D) image by selectively displaying one of a left image and a right image.

In selecting one of the left image and the right image, any one of the left image and the right image may be determined on the basis of quality of input image data or a performance efficiency of an apparatus which is reproducing the stereoscopic image.

After any one of the left image and the right image is selected, data of an image which has not been selected from each frame may be replaced by data of a selected image, to thereby change the stereoscopic image into the 2D image without causing a change in a frame rate.

To achieve the above objects, there is provided an apparatus, which forms a stereoscopic image by alternately displaying a left image and a right image, for reproducing a stereoscopic image in a trip mode, including: a decoder unit configured to perform decoding on received image information; a 3D format generation unit configured to pair left and right images which are temporally consistent to generate stereoscopic image data; and a user input processing unit configured to receive a user selection with respect to image reproduction and delivering a corresponding signal to the decoder unit and the 3D format generation unit, wherein when the user input processing receives a selection of a trip mode from the user, the decoder unit performs decoding at a high speed on the basis of the signal from the user input processing unit and the 3D format generation unit selects only any one of the left image and the right image to generate the stereoscopic image data.

According to exemplary embodiments of the present invention, when a trip mode is entered while a stereoscopic image is being displayed, the stereoscopic image is changed into a two-dimensional (2D) image, thus preventing the generation of an unnatural image or a distorted image even when an image is quickly displayed through high speed searching.

In addition, a stereoscopic image can be effectively changed into a two-dimensional (2D) image when a trip mode is entered, without having to employ an element for changing the displayed stereoscopic image into the 2D image.

Also, the generation of an unnatural image or a distorted image is prevented even when an image is quickly displayed through high speed searching, thus improving users' viewing satisfaction.

The foregoing and other objects, features, aspects and advantages of the present invention will become more appar-

DETAILED DESCRIPTION OF THE INVENTION

Figure 1:
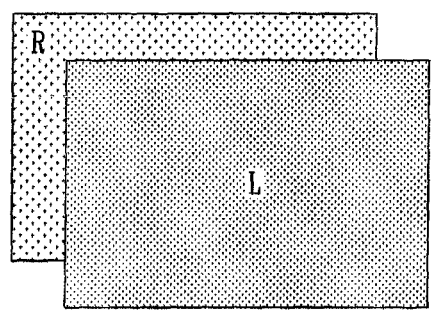
FIG. 1 is a view for explaining a scheme for dividing a screen frame by frame in a method for displaying a screen to form a stereoscopic image.

Embodiments of the present invention will be described below in detail with reference to the accompanying drawings, where those components are rendered the same reference number that are the same or are in correspondence, regardless of the figure number, and redundant explanations are omitted.

A term of 3-D or 3D is used to explaining a visual expression or representation technique for reproducing three-dimensional (3D) video having an optical illusion effect of depth. A visual cortex of an observer interprets two images, to namely, left-eye and right-eye images, as a single 3D image.

The 3D display technique employs a 3D image processing and representing technique with respect to a 3D image display-available device. Selectively, in order for the 3D image display available device to effectively provide a 3D image to the observer, a special observation device may have to be used.

Examples of 3D image processing and representation include capturing of a stereoscopic image/video, capturing of a multi-view image/video using a plurality of cameras, and processing of a 2D image and depth information, and the like. Examples of the 3D image display-available device include a liquid crystal display (LCD) having suitable hardware and/or software supporting a 3D display technique, a digital TV screen, a computer monitor, and the like. Examples of special observation devices may include specialized glasses, goggles, headgear, eyewear, and the like.

In detail, the 3D image display technique includes an anaglyph stereoscopic image (for which passive anaglyph glasses are generally used), a polarization stereoscopic image (for which, passive polarization glasses are generally used), and an alternate-frame sequencing (for which, active shutter glasses and head gear are used), an autostereoscopic display using a lenticular or barrier screen, and the like. Various ideas and features described hereinafter can be applicable to such stereoscopic image display technique.

A certain 3D image display technique may use an optical device which is rotated or alternatively operated, for example, a segmented polarizer attached to a color filter wheel, and in this case, the both must be necessarily synchronized. Other 3D image display techniques may use a digital light processor (DLP) based on a digital micromirror device (DMD) using a rotatable microscopic mirror disposed in a quadrangular arrangement corresponding to pixels of an image to be displayed.

Meanwhile, new type standards related to rendering of as stereoscopic image and a display technique (in particular 3D TV) are under development by various enterprises, consortium, and organizations. For example, there are the is society of motion picture and television engineers (SMPTE), a consumer electronics association (CEA), a 3d@Home consortium, and international telecommunication union), and the like. Besides, other standardization groups such as DVB, BDA ARIB, ATSC, DVD forum, IEC, and the like, are participating. MPEG (Moving Picture Experts Group) are participating in 3D image coding of a multi-view image, a stereoscopic image, and a 2D image having depth information, and currently, a multi-view video coding extension with respect to an MPEG-4 AVC (Advanced Video Coding) is under standardization. The stereoscopic image coding and stereoscopic distribution formatting are related to color shifting (Anaglyph), pixel sub-sampling (side-by-side, checkerboard, quincunx), and enhanced video coding (2D+delta, 2D+meta data, 2D having depth information). The ideas and features described herein can be applicable to such standards.

Also, at least a portion of the ideas and features described herein is related to a 3D image display technique described in terms of an image reproducing and displaying environment with respect to a digital image or a 3D TV. However, such details are not meant to limit various features described herein but can be applicable to different types of display techniques and devices. For example, the 3D TV technique can be applicable to Blu-ray™, console games, cable, and IPTV transmission, mobile phone contents delivery, and the like, and in this case, it can be compatible with different types of TVs, a set-top box, Blu-ray device (e.g., Blu-ray disk (BD) player), a DVD player, and a TV contents distributor.

Meanwhile, a left and a right image are displayed to form a stereoscopic image, and in this case, frames are transmitted 60 times per second for each image. Namely, when the stereoscopic image is displayed on the screen at a rate of a total 120 Hz or higher, the stereoscopic image can be implemented without a flickering phenomenon.

The method of alternately displaying a left image and a right image to implement a stereoscopic image includes a frame by frame scheme, a side by side scheme, and a top-down scheme.

Figure 2:
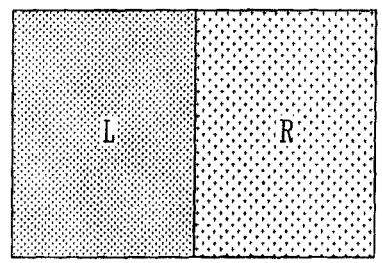
FIG. 2 is a view for explaining a scheme for dividing the screen side by side in the method for displaying a screen to form a stereoscopic image.
Figure 3:
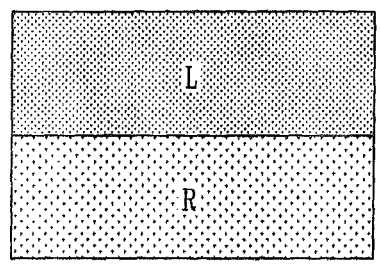
FIG. 3 is a view for explaining a scheme for dividing the screen top-down is in the method for displaying a screen to form a stereoscopic image.

As shown in FIG. 1, the frame by frame scheme is a method in which a left image and a right image are alternately scanned to the entire screen. As shown in FIG. 2, the side by side scheme is a method of dividing a screen into left and right screens and scanning a left image and a right image to the respective screens As shown in FIG. 3, the top-down scheme is a method of dividing the screen into upper and lower screens and scanning left and right images to the respective screens.

Figure 4:
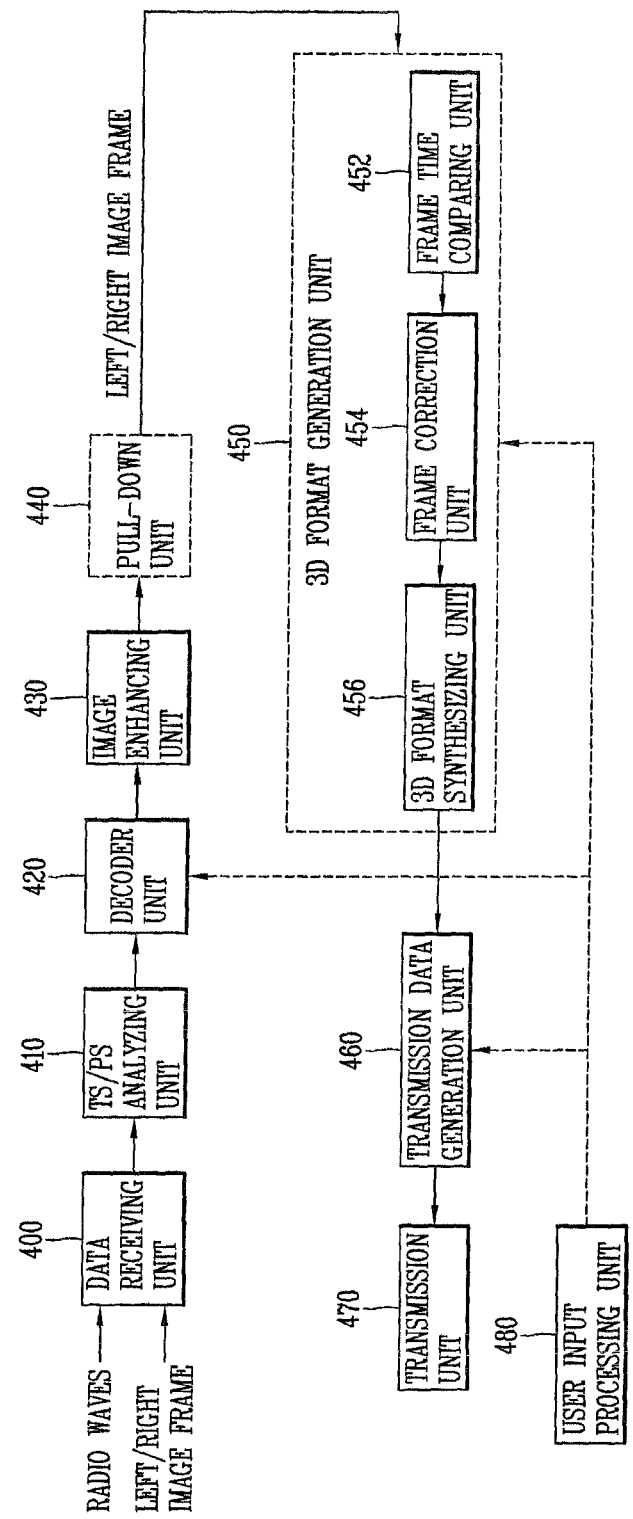
FIG. 4 is a schematic block diagram showing the configuration of an apparatus for reproducing a stereoscopic image according to an exemplary embodiment of the present invention.

An apparatus for reproducing a stereoscopic image according to an exemplary embodiment of the present invention will now be described. FIG. 4 is a schematic block diagram showing the configuration of an apparatus for reproducing a stereoscopic image according to an exemplary embodiment of the present invention.

A data receiving unit 400 loads image data from radio waves or a storage medium such as a disk and generates a transport stream (TS) or a packetized stream. In general, the video data transmitted through radio waves or a disk is formatted in the form of a transport stream of an MPEG (Moving Picture Experts Group) system.

In particular, MPEG-2, a processing method for compressing video of high picture quality, is widely used in various fields such as a storage medium such as a DVD (Digital Versatile Disk), a digital TV broadcast such as a satellite, a cable, terrestrial, and the like, a personal video recorder (PVR), a video transmission in a network, and the like.

The generated transport stream is delivered to a TS/PS analyzing unit 410. The TS/PS analyzing unit 410 performs a filtering and parsing operation to filter out a desired packet desired to be reproduced with respect to the transport stream, to generate an elementary stream (ES) including both image information and audio information.

The elementary stream output from the TS/PS analyzing unit 410 is decoded in a decoder unit 420 suitable for a corresponding codec and output as an image frame. The decoder unit 420 also performs decoding on the audio information, but a description thereof will be omitted for the sake of brevity.

In an exemplary embodiment of the present invention, the case in which a particular codec is set as a default in the decoder unit 420 has been described. However, the setting of the codec of the decoder unit 420 may be changed according to a user selection. Namely, the coded applied to decoding may be changed through a user's selective input. In this case, MPEG-2, MPEG-4 PART 2, H.264, and the like, may be selected as a coded.

In the apparatus for reproducing a stereoscopic image using a codec such as a multi-view video codec (MVC), and the like, a demultiplexer function is added to an output part of the decoder unit 420 in order to split video data, which has been delivered as a single stream before the decoder unit 420, into a left image and a right image, and delivers them to an image enhancing unit 430. At this time, the left and right images are synchronized by using time stamp information.

Thereafter, the image frame is deinterlaced or image-reinforced in the image enhancing unit 430.

In a 2D image reproducing apparatus, the image frames output from the image enhancing unit 430 are delivered to a transmission data generation unit 460, and if necessary, they are overlaid with a different image or re-formatted such that it can be transmitted to a device, such as a TV, for displaying an image. Thereafter, a transmission unit 470 such as a high definition multimedia interface (HDMI) transmits image data to the device, such as a TV, for displaying an image. In this case, if the reproducing device is integrated with a TV, the image may be directly delivered to a display unit, without going through the transmission unit 470.

Meanwhile, in a 3D reproducing apparatus, a pull-down processing (440) is performed after the image enhancing unit 430, which is then delivered to the 3D format generation unit 450, so as to be generated as a 3D image format. Thereafter, the 3D format image data is processed to have a form that can be transmitted to a device, such as a TV, or the like, for displaying an image, by the transmission data generation unit 460 and then transmitted through the transmission unit 470.

As described above, when the 3D image reproducing apparatus and the device, such as a TV, and the like, for displaying an image are integrally configured, the data may be delivered to the display unit without going through the transmission unit 470.

Meanwhile, a user input processing unit 480 performs a device controlling according to a user input inputted through an input button, a remote controller, a network, and the like. In detail, the user input processing unit 480 performs various control operations including controlling reproducing, stopping, and a multiple speed operation with respect to the decoder unit 420, and resolution regulation, an interface mode controlling, and the like with respect to the transmission data generation unit 460.

The 3D format generation unit 450 of the apparatus for reproducing a stereoscopic image according to an exemplary embodiment of the present invention will now be described in detail.

The 3D format generation unit 450 includes a frame time comparing unit 452, a frame correction unit 454, and a 3D format synthesizing unit 456.

Two streams, namely, a left image frame stream and a right image frame stream, are input to the 3D format generation unit 450 from the image enhancing unit 430. In this case, as for the frames received from the image enhancing unit 430, the left and right images which are temporally consistent are paired to generate a stereoscopic image.

Thus, first, the frame time comparing unit 452 analyzes and compares the time relationship with respect to the received frames. Thereafter, the frame correction unit 454 processes frames having a delayed time relationship.

Finally, the 3D format synthesizing unit 456 pairs the left and right images which are temporally consistent to generate 3D image data, and delivers the generated 3D image data to the transmission data generation unit 460.

The operation of the 3D format synthesizing unit 456 according to an exemplary embodiment of the present invention in each reproducing speed will now be described with reference to FIGS. 5 and 6.

Figure 5:
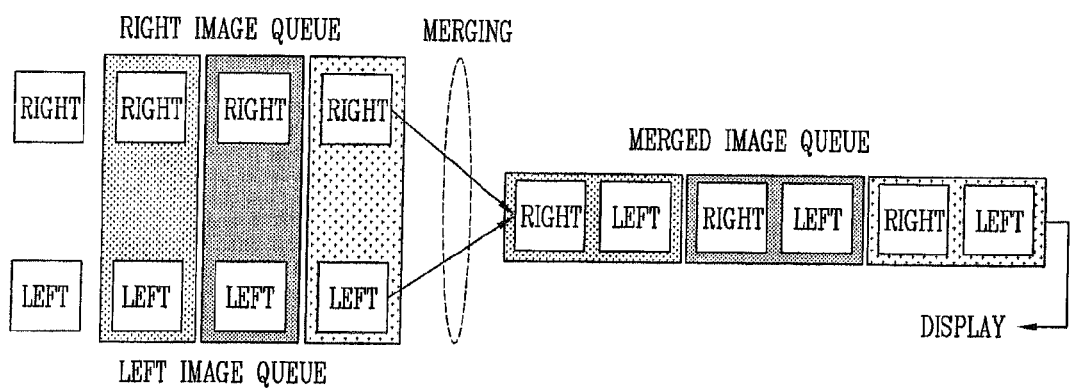
FIG. 5 is a view for explaining an operation of a 3D format synthesizing unit when a stereoscopic image is reproduced at a normal speed according to an exemplary embodiment of the present invention.
Figure 6:
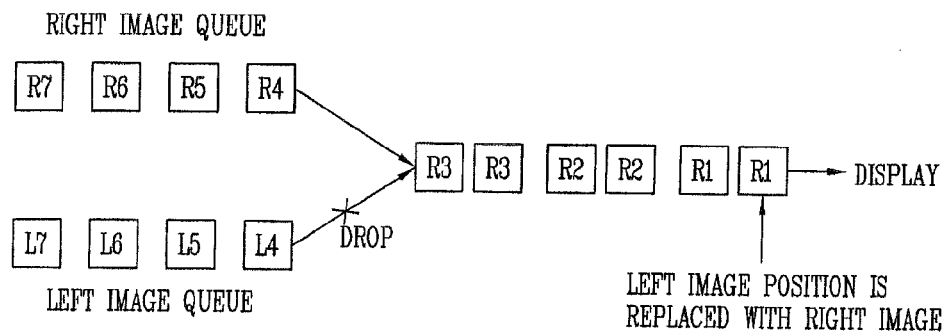
FIG. 6 is a view for explaining the operation of the 3D format synthesizing unit when a trip mode is entered by a user while a stereoscopic image is being reproduced at the normal speed according to an exemplary embodiment of the present invention.

FIG. 5 is a view for explaining an operation of the 3D format synthesizing unit 456 when a stereoscopic image is reproduced at a normal speed according to an exemplary embodiment of the present invention, and FIG. 6 is a view for explaining the operation of the 3D format synthesizing unit 456 when a trip mode is entered by a user while a stereoscopic image is being reproduced at the normal speed according to an exemplary embodiment of the present invention.

As shown in FIG. 5, when a stereoscopic image is reproduced at a normal speed, the 3D format synthesizing unit 456 according to an exemplary embodiment of the present invention merges a left image and a right image waiting in a left image queue and a right image queue, respectively, into a pair of left and right images, to constitute a merged image queue, and delivers the same to the transmission data generation unit 460.

While the stereoscopic image is being reproduced at the normal speed, when the user selects a trip mode, the 3D format synthesizing unit 456 stops the operation of merging the left and right images in the left image queue and the right image queue and delivering the same. And, the 3D format synthesizing unit 456 selectively delivers any one of the left and right images of the left image queue and the right image queue.

The operation of the 3D format synthesizing unit 456 according to an exemplary embodiment of the present invention when the trip mode is entered by the user while the stereoscopic image is being reproduced at the normal speed is illustrated in FIG. 6.

As shown in FIG. 6, when the trip mode is entered, the 3D format synthesizing unit 456 selects any one of the left and right images waiting in the left image queue and the right image queue. In this case, one of the left and right images may be selected on the basis of quality of image data or a performance efficiency of the stereoscopic image reproducing apparatus.

In addition, the 3D format synthesizing unit 456 transmits the selected image twice per frame, whereby it constitutes the 3D format image data, which has been transmitted as a pair of left and right images, as a pair of right and right is images and delivers the same. Accordingly, in the exemplary embodiment of the present invention, the stereoscopic image can be changed into a 2D image without changing a previous frame rate at which the pair of left and right images was transmitted.

In the present exemplary embodiment, when the trip mode is entered, the 3D format synthesizing unit 456 selects the right image, but the present invention is not limited thereto and the left image may be selected as described above.

In a different exemplary embodiment, the user may select changing of the display of the 2D image to a stereoscopic image in the operation of the trip mode. Namely, the user may want to display a stereoscopic image instead of the 2D image even in the trip mode. In this case, when the corresponding selection of the stereoscopic image is input from the user, the user input processing unit 480 of FIG. 4 transmits a control signal to the 3D format generation unit 450. Accordingly, the 3D format generation unit 450 resumes the operation of merging the left and right images as a pair of left and right images, delivers the same to the transmission data generation unit 460, and accordingly, the 2D image is changed to a stereoscopic image.

In the different exemplary embodiment, the user can select and display the 2D image or the stereoscopic image in the trip mode, so the user convenience can be improved.

In a still different exemplary embodiment, when content of an image of a type set by the user is reached in the operation of the trip mode, the stereoscopic image may be reproduced at the normal mode. Namely, when the trip mode is entered, a particular object may be set according to a user selection, and thereafter, when an image including the corresponding object is reached while is reproducing in the trip mode, the stereoscopic image may be reproduced again at the normal mode.

In this embodiment, the user can quickly access the desired image, so the user convenience can be further improved.

As described above, when the trip mode is entered by the user while the stereoscopic image is being reproduced, the stereoscopic image may be changed to a 2D image, whereby an unnatural screen image or a distortion phenomenon cannot be generated even in the trip mode. Also, the stereoscopic image can be effectively changed into the 2D image when the trip mode is entered without employing any additional configuration. Meanwhile, because an unnatural screen image or a distortion phenomenon is not generated even in the fast image displaying in the trip mode, the users' viewing satisfaction can be improved.

Various exemplary embodiments have been described to explain the original concept related to various aspects of the present invention. However, one or more substantial features of a particular exemplary embodiment can be applicable to one or more of other exemplary embodiments. Some elements or steps described in the respective exemplary embodiments and relevant drawings may be corrected and supplementary elements and/or steps may be deleted, moved or included.

Various features and ideas described herein may be performed by software, hardware, firmware, middleware, or any of their combinations. For example, a computer program (executed by a computer, processor, controller, and the like) stored in a computer-executable medium for implementing reproduction of a stereoscopic image in a trip mode and an apparatus for reproducing a stereoscopic image may include one or more program code sections performing is various operations. Similarly, a software tool (executed by a computer, a processor, a controller, and the like) stored in a computer-executable medium for implementing reproduction of a stereoscopic image in a high speed search mode and an apparatus for reproducing a stereoscopic image may include a portion of a program code performing various operations.

The present invention can be applicable to any device that is able to display a stereoscopic image such as a digital TV, an LCD display device, a personal media player (PMP), a mobile phone, a computer monitor, and the like.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An image reproduction method, the method comprising:
    reproducing a stereoscopic image;
    receiving a selection of a trick mode from a user while the stereoscopic image is being reproduced;
    changing the stereoscopic image into a two-dimensional image by selecting one of a left image and a right image, when the trick mode is selected;
    receiving a setting for an object from the user when the trick mode is selected; and
    automatically reproducing the stereoscopic image at a normal speed, when an image including the object is reached while reproducing the stereoscopic image is performed in the trick mode, wherein the setting for the object is received prior to being provided in the trick mode,
    wherein after any one of the left image and the right image is selected, data of an image that has not been selected from each frame is replaced by data of a selected image, to thereby change the stereoscopic image into the two-dimensional image without causing a change in a frame rate.

2. The method of claim 1, wherein, in selecting one of the left image and the right image, any one of the left image and the right image is determined on the basis of quality of input image data or a performance efficiency of an apparatus that is reproducing the stereoscopic image.

3. The method of claim 1, further comprising:
    receiving a selection for changing the two-dimensional image being reproduced in the trick mode into the stereoscopic image from the user; and
    changing the two-dimensional image being reproduced in the trick mode into the stereoscopic image and reproducing the same.

4. An image reproduction apparatus, the apparatus comprising:
    a decoder unit configured to perform decoding on received image information;
    a three-dimensional format generation unit configured to pair left and right images that are temporally consistent to generate stereoscopic image data; and
    a user input processing unit configured to receive a user selection with respect to image reproduction and deliver a corresponding signal to the decoder unit and the three-dimensional format generation unit, wherein when the user input processing receives a selection of a trick mode from the user, the decoder unit performs decoding at a high speed on the basis of the signal from the user input processing unit and the three-dimensional format generation unit selects only any one of the left image and the right image to generate the stereoscopic image data, wherein the user input processing unit is configured to receive a setting for an object from the user when the trick mode is selected, and to automatically reproduce the stereoscopic image at a normal speed when an image including the object is reached while reproducing the stereoscopic image is performed in the trick mode, wherein the setting for the object is received prior to providing the image reproducing apparatus in the trick mode, and wherein after any one of the left image and the right image is selected, data of an image that has not been selected from each frame is replaced by data of a selected image, to thereby change the stereoscopic image into a two-dimensional image without causing a change in a frame rate.

5. The apparatus of claim 4, wherein, in selecting one of the left image and the right image, any one of the left image and the right image is determined on the basis of quality of input image data or a performance efficiency of an apparatus that is reproducing the stereoscopic image.

6. The apparatus of claim 4, wherein when the user input processing unit receives a selection for changing the two-dimensional image being reproduced in the trip mode into the stereoscopic image, the two-dimensional image being reproduced in the trick mode is changed into the stereoscopic image.

7. The apparatus of claim 4, wherein a codec set in the decoder unit is changeable according to a user selection.

8. A television, which forms a stereoscopic image by alternately displaying a left image and a right image, for reproducing a stereoscopic image in a trip mode, the apparatus comprising:
    a decoder unit configured to perform decoding on received image information;
    a three-dimensional format generation unit configured to pair left and right images that are temporally consistent to generate stereoscopic image data; and
    a user input processing unit configured to receive a user selection with respect to image reproduction and delivering a corresponding signal to the decoder unit and the three-dimensional format generation unit,
    wherein when the user input processing receives a selection of a trick mode from the user, the decoder unit performs decoding at a high speed and the three-dimensional format generation unit selects only any one of the left image and the right image to generate the stereoscopic image data,
    wherein the user input processing unit is configured to receive a setting for an object from the user when the trick mode is selected, and to automatically reproduce the stereoscopic image at a normal speed when an image including the object is reached while reproducing the stereoscopic image is performed in the trick mode, wherein the setting for the object is received prior to providing the television in the trick mode, and
    wherein after any one of the left image and the right image is selected, data of an image that has not been selected from each frame is replaced by data of a selected image, to thereby change the stereoscopic image into a two-dimensional image without causing a change in a frame rate.

9. The television of claim 8, wherein, in selecting one of the left image and the right image, any one of the left image and the right image is determined on the basis of quality of input image data or a performance efficiency of an apparatus which that is reproducing the stereoscopic image.

10. The television of claim 8, wherein when the user input processing unit receives a selection for changing the two-dimensional image being reproduced in the trick mode into the stereoscopic image, the two-dimensional image being reproduced in the trick mode is changed into the stereoscopic image.

11. The television of claim 8, wherein a codec set in the decoder unit is changeable according to a user selection.

* * * * *